Oct. 5, 1965 R. C. BENTON ETAL 3,210,632
AUTOMATIC MOTOR CONTROLLED POSITIONING APPARATUS
Filed April 24, 1961 10 Sheets-Sheet 1

INVENTORS.
Robert C. Benton
Roger R. Whitehouse
BY
Webb, Mackey & Burden
THEIR ATTORNEYS INVENTORS.
Robert C. Benton
Roger R. Whitehouse
BY Webb, Mackey & Burden
THEIR ATTORNEYS

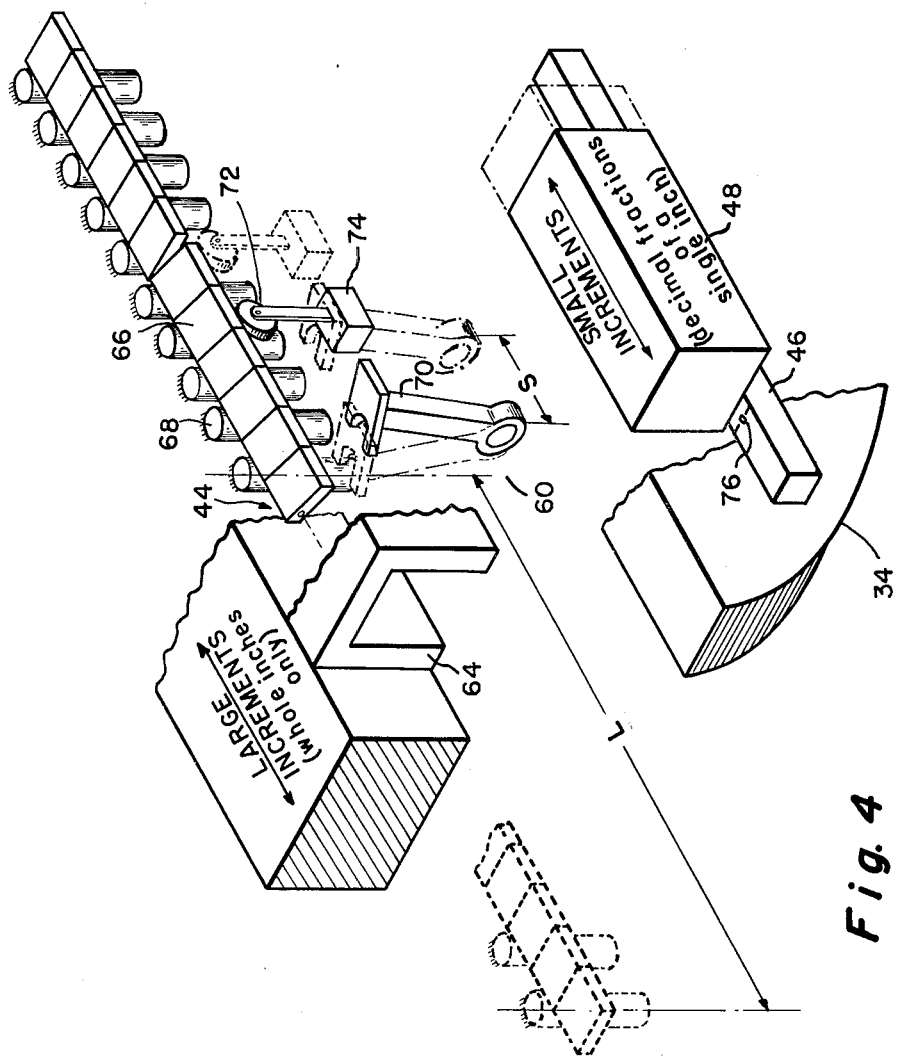
Fig. 4
INVENTORS.
Robert C. Benton
Roger R. Whitehouse
BY
THEIR ATTORNEYS INVENTORS.
Robert C. Benton
Roger R. Whitehouse
BY Webb, Mackey & Burden
THEIR ATTORNEYS

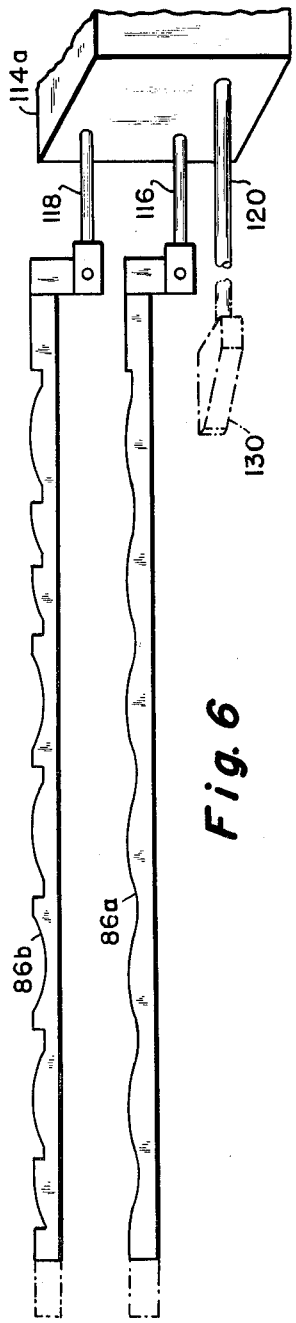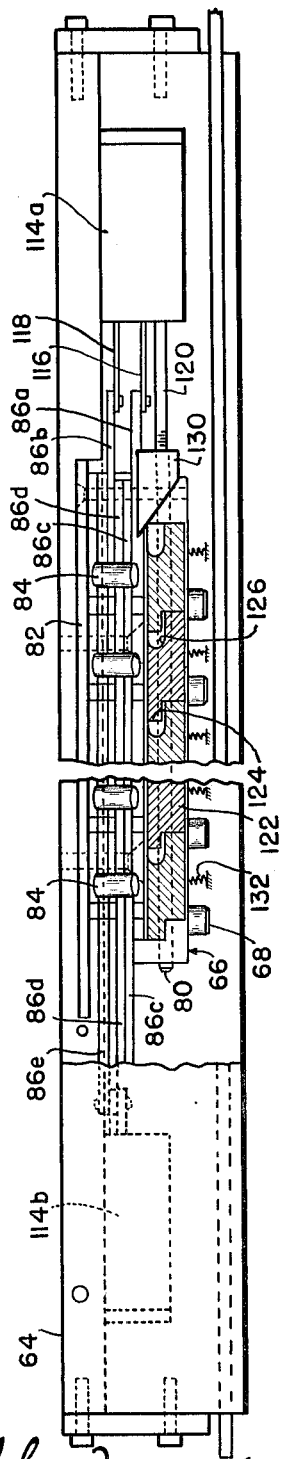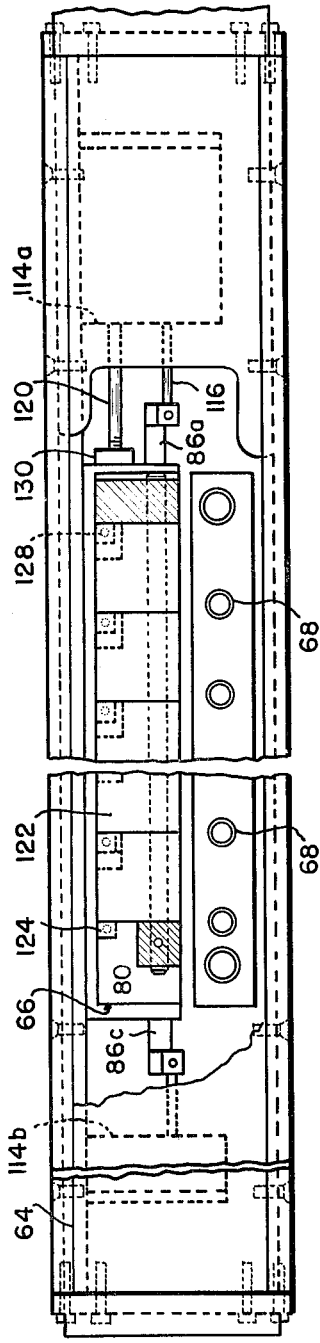

Oct. 5, 1965   R. C. BENTON ETAL   3,210,632
AUTOMATIC MOTOR CONTROLLED POSITIONING APPARATUS
Filed April 24, 1961   10 Sheets-Sheet 6

INVENTORS.
Robert C. Benton
Roger R. Whitehouse
BY
Webb, Mackey & Burden
THEIR ATTORNEYS

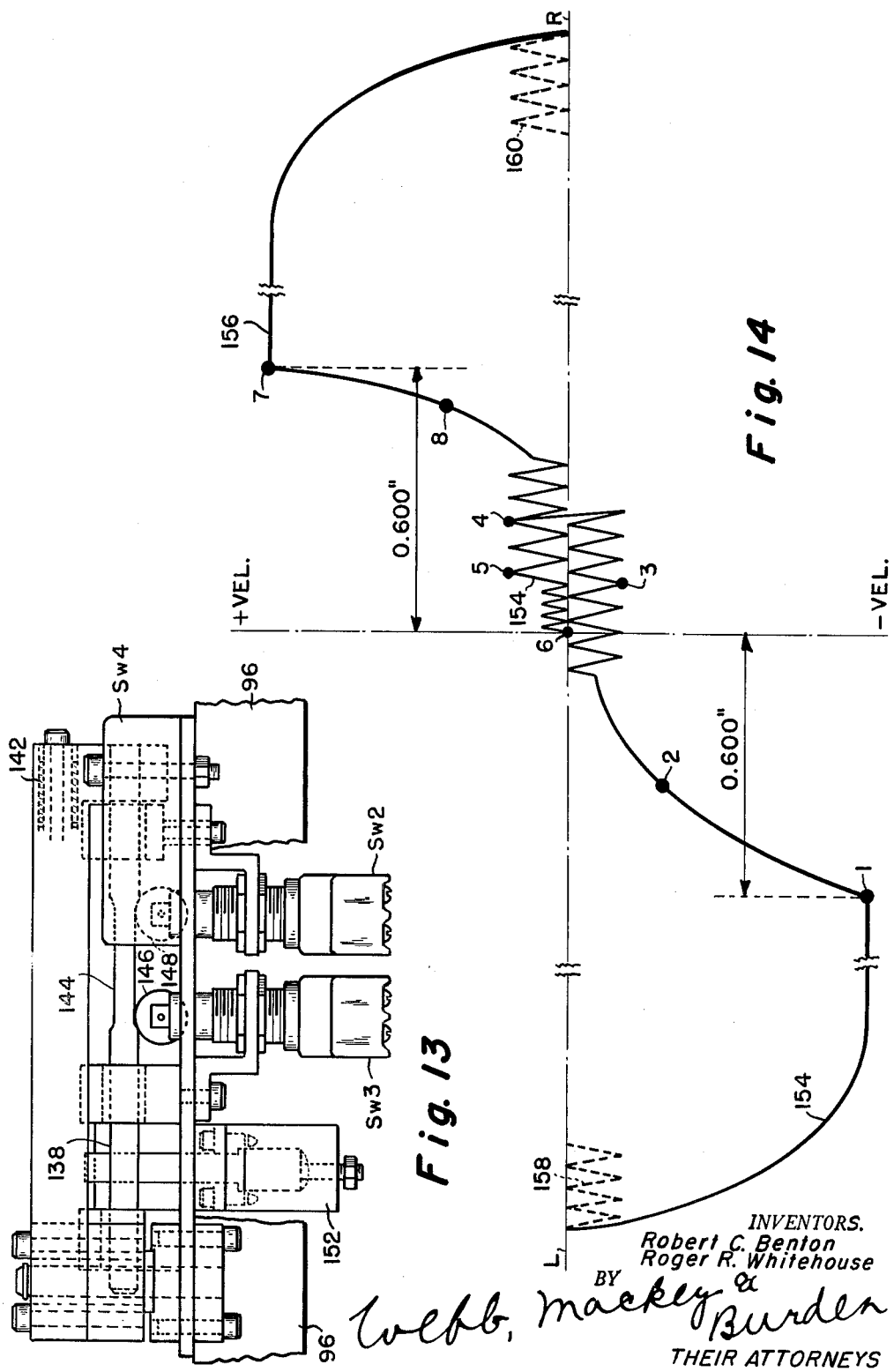

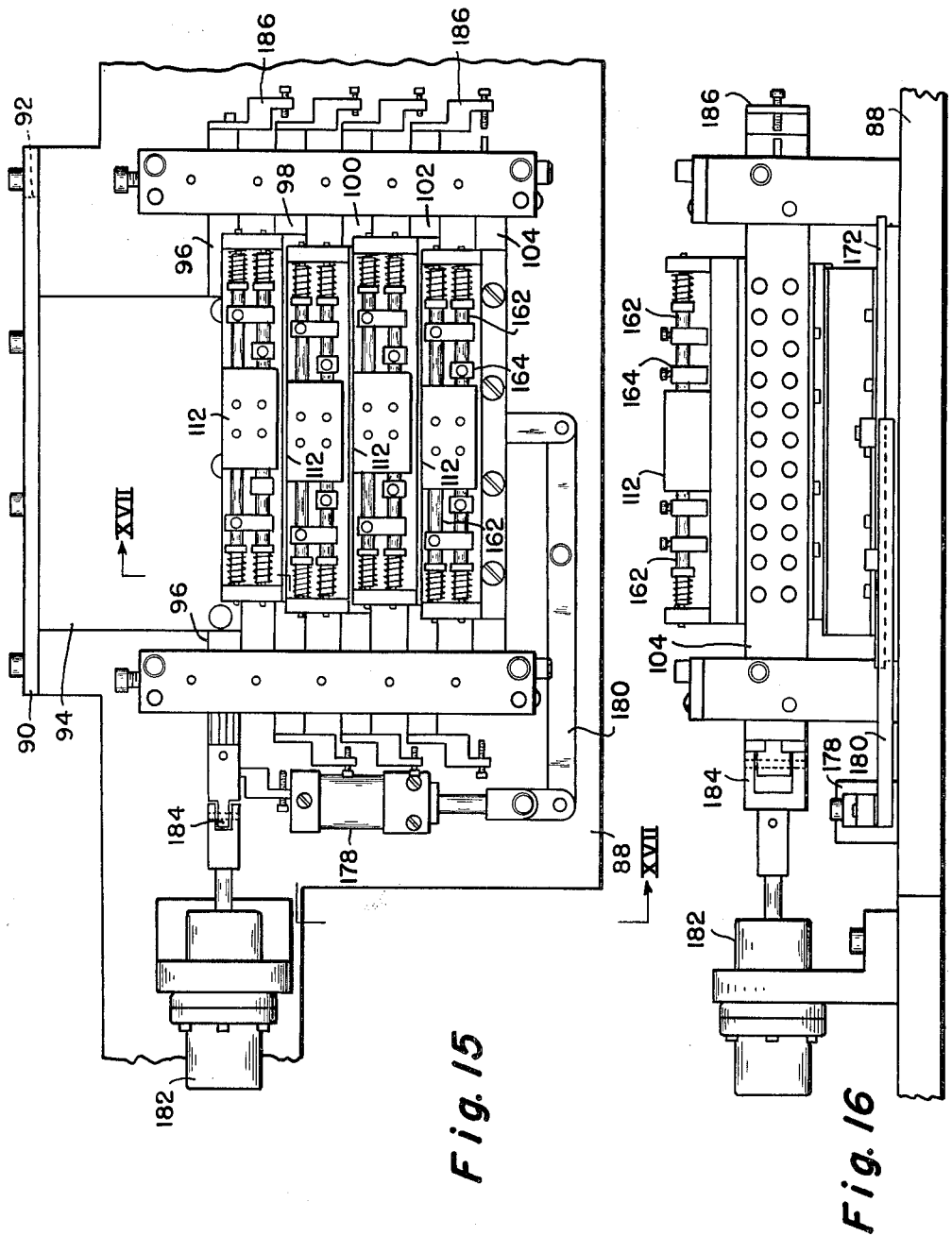

Oct. 5, 1965

R. C. BENTON ETAL 3,210,632

AUTOMATIC MOTOR CONTROLLED POSITIONING APPARATUS

Filed April 24, 1961

INVENTORS.
Robert C. Benton
Roger R. Whitehouse
BY
Webb, Mackey & Burden
THEIR ATTORNEYS

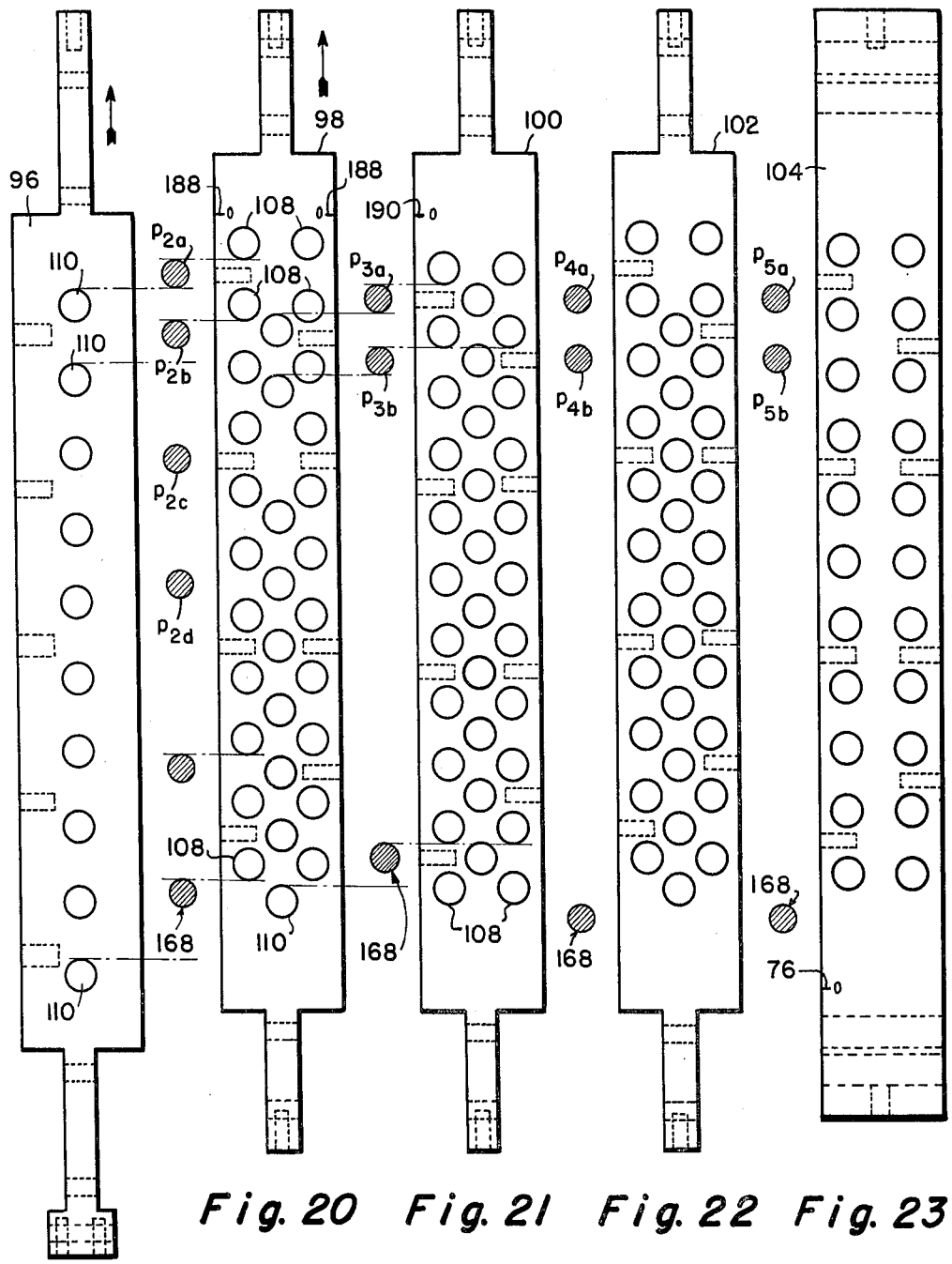

3,210,632
AUTOMATIC MOTOR CONTROLLED POSITIONING APPARATUS
Robert C. Benton and Roger R. Whitehouse, State College, Pa., assignors to Chemcut Corporation, a corporation of Pennsylvania
Filed Apr. 24, 1961, Ser. No. 104,990
15 Claims. (Cl. 318—162)

This invention relates to a machine tool table which is adapted to support a workpiece and which has universal rectilinear movement along two coordinate axes. It relates more particularly to control apparatus for automatically positioning the table by orderly establishment of a sequence of large and small increment settings which are of a cumulative effect enabling the workpiece to be stopped at precisely the right decimal point or points for machining as desired.

The present invention employs the decimal to binary code system of positioning, by which we mean that dial-carrying rotary switches or like devices are provided which will automatically encode decimal machining data set on the dials, into a binary code needed to operate the respective positioners of the present apparatus. For piecework operation the dials are generally manually set whereas for quantity production a tape reader and punched paper tape are provided; the tape is prepunched in binary code enabling the tape reader to control the increment positioners directly.

The positioning of the table is arranged for along one of the axes in a two-stage sequence while a similar positioning sequence is taking place along the other axis. More particularly with reference to the longitudinal axis of the table, a relatively fixed pawl located, for instance, on the saddle movably supporting the table, is shifted axially a distance by a gage which is supported on the saddle and which supports the pawl. The distance is a decimal fraction (not exceeding one inch) from some zero reference point on the gage and being a predetermined amount of distance short from a desired point of, say, 0.4321" past zero as set by the gage itself. Next, the table is moved longitudinally, carrying therewith a set of fixed pins which are axially spaced apart one inch center to center and provided thereon so as to pass the pawl as they move with the table.

A cam mechanism trips the pawl at the proper time to pivot it into contact with a predetermined pin, say the pin at the five inch mark in the pin set, and due to this contact with the moving pin the pawl attempts to move. At the inception of this motion, a series of motion sensitive table limit switches which is provided begins to be tripped open rapidly by the pawl in sequence with the movement thereof through said predetermined short amount of distance so as to slow down the table within that distance and stop it exactly when the pawl reaches a position corresponding to the selected 0.4321" gage point noted. Thus the table stops having accurately taken a position 5.4321" away from zero. For this purpose, highly accurately set, stopping switch mehhanism is provided among the limit switches to control the stopping of the table.

The same sequence of operation is occurring simultaneously between another fixed pawl on the knee supporting the saddle, for example, and another set of pins carried by the saddle itself, it being understood that saddle motion is at right angles to the longitudinal table axis so as to establish a mutually perpendicular coordinate relationship therewith. Inasmuch as any point in the plane of the table is susceptible of accurate location in terms of these two coordinates, the table can be controlled accurately in its point to point movement. Thus automatic machining such as boring, drilling, grinding, planing, routing and the like can be accomplished within closely set, automatically reached limits. Obviously, the foregoing figure 5.4321" is only exemplary of one ordinate reading one way and any two coordinate decimal readings can be set, up to the full lengths of travel of both the table and the saddle.

In order to provide for unidirectional motion of approach to the highly accurately-set, stopping switch above noted, we provide a table motion reversing switch among the motion sensitive limit switches referred to which, if the table is approaching the limit switch in the wrong direction, will allow the table to drift slightly past the desired ordinate point whereupon the reversing switch causes immediate reversal of table motion. We also provide a companion switch which, when the table is committed in the right direction of approach, slows down the table so that thereafter it can be jogged (without overdrift) into final position as by means of a stepping motor.

The noted cam mechanism for tripping the pawl comprises, more specifically, a feeler fixed adjacent the pawl and a jointed cam track on which the feeler rides and which undergoes relative motion with respect to the feeler and pawl. It is the selected breaks at the joint of the continuous cam track (which the riding feeler inherently senses) that enable the feeler to trip the pawl at precisely the right point during relative movement. Tripping the pawl with this precision enables it to make a flying catch of the right pin despite the fact that the table is traversing at substantially full speed.

A highly significant, if not essential, feature of our invention is the provision of a set of code bars in each increment positioner effective to convert binary code information into direct linear measurements by a straightforward mechanical operation. More particularly, each set consisting of several code bars has irregularly spaced teeth provided along one edge of each bar. The resulting spaces between the teeth on the bars are arranged so that only one space between all of the transversely aligned teeth will be completely clear across the bars for each combination of positions of the bars, each such bar being slidable lengthwise a short distance relative to the other bars of the set. We provide an increment positioner setting pin opposite each possibly opened space on the set of code bars, and we bias the pins onto the bar teeth in a manner whereby for every one of the utilized binary coded positions taken by the code bars, only a single setting pin can find a completely free space to move into. These pins in turn are decimally related by their physical position to the increment positioners. They thusly provide an accurate decimal point by which the positioner can preset for each reading for the table as will now be more fully explained.

Features, objects and advantages will either be specifically pointed out or become apparent when, for a better understanding of the invention, reference is made to the description taken in conjunction with the accompanying drawings in which:

FIGURE 4 is a highly schematic perspective view of a control component appearing in FIGURES 2 and 3 in connection with the work positioning structure;

FIGURE 6 is an exploded view of a portion of the code bars appearing in end view of FIGURE 5;

FIGURE 7 is a side elevational view of the cam track, partially broken away, which appears in end view in FIGURE 5;

FIGURE 8 is a bottom plan view of the cam track of FIGURE 7;

FIGURES 12 and 13 are side elevational and bottom plan view of the motion determining mechanism of FIGURE 11;

FIGURE 14 is a velocity displacement diagram to show the stopping pattern effectuated by the motion determining mechanism;

FIGURES 15 and 16 are front elevational and bottom plan views of the gage mechanism in the small increment positioner appearing in FIGURE 5;

FIGURES 19, 20, 21, 22 and 23 are longitudinal plan views of the positioning bar elements forming the gage mechanism of FIGURES 5 and 15.

Figures 1, 2:
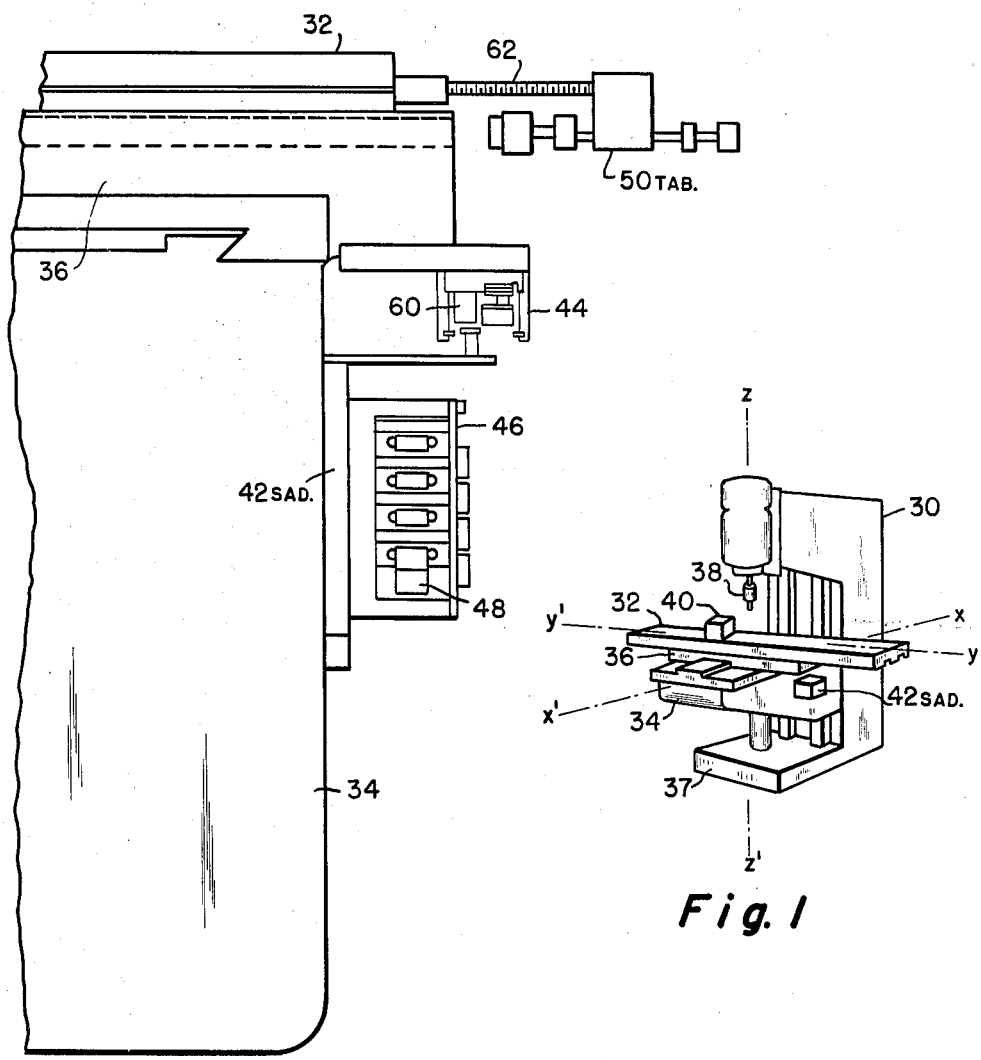
FIGURE 1 is a perspective view of a machine tool embodying the present invention.
FIGURES 2 and 3 are front and side elevational views of the workpiece carrying structure of the machine of FIGURE 1.

More particularly, in reference to FIGURE 1 of the drawings, a machine tool 30 which is selected by way of example for illustrating the present invention consists of a vertical boring mill shown equipped in conventional way with a longitudinal table 32, a curved knee 34 below the table, and a saddle 36 which supports the table 32 and which is supported by the knee 34. The foregoing elements of structure are carried by the base 37 of the machine tool 30 which further includes a motor-driven milling head 38 disposed above the table 32. The table 32 carries a workpiece 40 clamped thereto for receiving some work operation by the head 38.

A positioning control $42_{sad}$ automatically controls the position of the saddle 36 with respect to the knee 34 along an $xx'$ axis transverse to the table 32. A similar positioning control $42_{tab}$ (not shown in FIGURE 1) controls the position of the table 32 with respect to the saddle 36 along the $yy'$ longitudinal axis of the table. The foregoing arrangement is known as a two-axis positioning table.

If desired, a similar positioning control $42_{knee}$, not shown, can be provided for controlling the position of the knee relative to the base 37 along a $zz'$ axis. In this way, certain operations can be automatically performed in three dimensions as the milling head 38 is continually driven.

Figure 3:
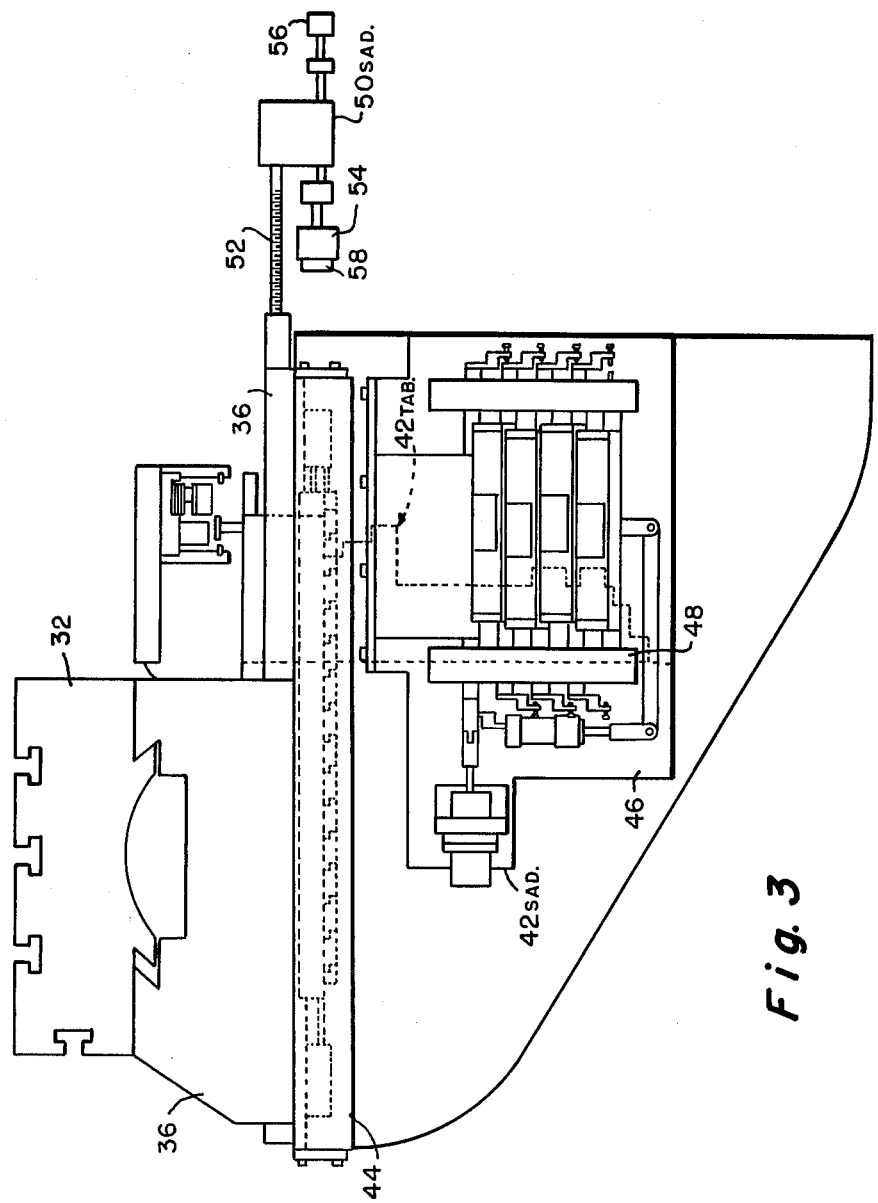

In FIGURES 2 and 3, the positioning control $42_{sad}$ comprises two devices termed positioners. One such device is the large increment positioner 44 which, more accurately defined, is a large increment position setting device. The other device is a small increment positioner 46 comprising a gage mechanism 48.

A table drive mechanism $50_{sad}$ is schematically represented comprising a differential gear box for operating a lead screw 52 connected for driving the saddle 36. The lead screw 52 constitutes the common output shaft of the differential gear box which presents one input shaft driven from a main electric motor 54 and another input shaft driven by a stepping motor 56. The stepping motor 56 is arranged to operate both in concert with the main motor 54 and also without the main motor 54, in which latter case a brake 58 is automatically applied to the main motor 54 to hold the corresponding input shaft fast against rotation.

The gage mechanism 48 of the small increment positioner 46 moves a reference head comprising a pawl and feeler mechanism 60 through small increments of travel. The pawl and feeler mechanism 60 is connected to the motors 54 and 56, enabling the small increment positioner 46 to act as a motion determining element to stop the saddle and table 32 in a way presently appearing.

The table positioner $42_{tab}$ constitutes two mutually coperating increment positioner devices similar to the ones 44 and 46 just described. It also includes a table drive $50_{tab}$ under control of these positioner devices so as to operate the table along its longitudinal axis by means of a lead screw 62 (FIGURE 2). The operation will be apparent from an understanding of the positioners 44 and 46 and, for the sake of brevity, is omitted herefrom.

In FIGURE 4, the pawl and feeler mechanism 60 is shown in a highly schematic way to bring out the cooperation which it establishes as between the large increment positioner 44 and the gage mechanism 48 of the small increment positioner 46. An inverted U channel which is carried by the saddle and which is open at the bottom forms a supporting box 64 for a bi-level, segmentally jointed cam track 66 extending continuously along the interior of the box. Also within the box 64 is a line of depending eccentric pins 68 which are spaced apart accurately one inch center to center and each of which corresponds in number and position with a different joint of the cam track 66 although separately mounted therefrom.

The line of pins 68 and the cam track 66 move longitudinally relative to a V-notched pawl 70 and a riding roller or feeler 72 in the mechanism 60 which is carried by the gage mechanism 48. A finder switch 74 which supports the feeler 72 is connected for support by the mechanism 48 in a way whereby the spaced-apart relation between the home position of the pawl 70 and the switch 74 remains constant. With reference to a fixed "zero" point 76, the gage 48 can move the pawl and feeler mechanism 60 to a point anywhere between $0''\pm0.0001''$ and $0.9999''\pm0.0001''$. This distance of travel is indicated by the numeral S in FIGURE 4. The reference head which is connected between the gage 48 and the pawl 70 and switch 74 and which supports the latter is omitted to simplify the schematic showing.

In operation, the line of pins 68 and the bi-level cam track 66 move past the reference head through a large increment L to a point at which the feeler 72 detects the location of a break in the cam track. At the point where it rides from the level at the high side of the break onto the low side or vice versa, the feeler 72 operates the finder switch 74 in a way to trip the pawl 70 and pivot it into contact with the appropriate confronting pin in the line of pins 68. At that point, a take-over circuit of the small increment positioner 46 functions with its motion determining action in a manner presently appearing so as to stop the movement at the prescribed point set by the gage mechanism 48.

Figure 5:
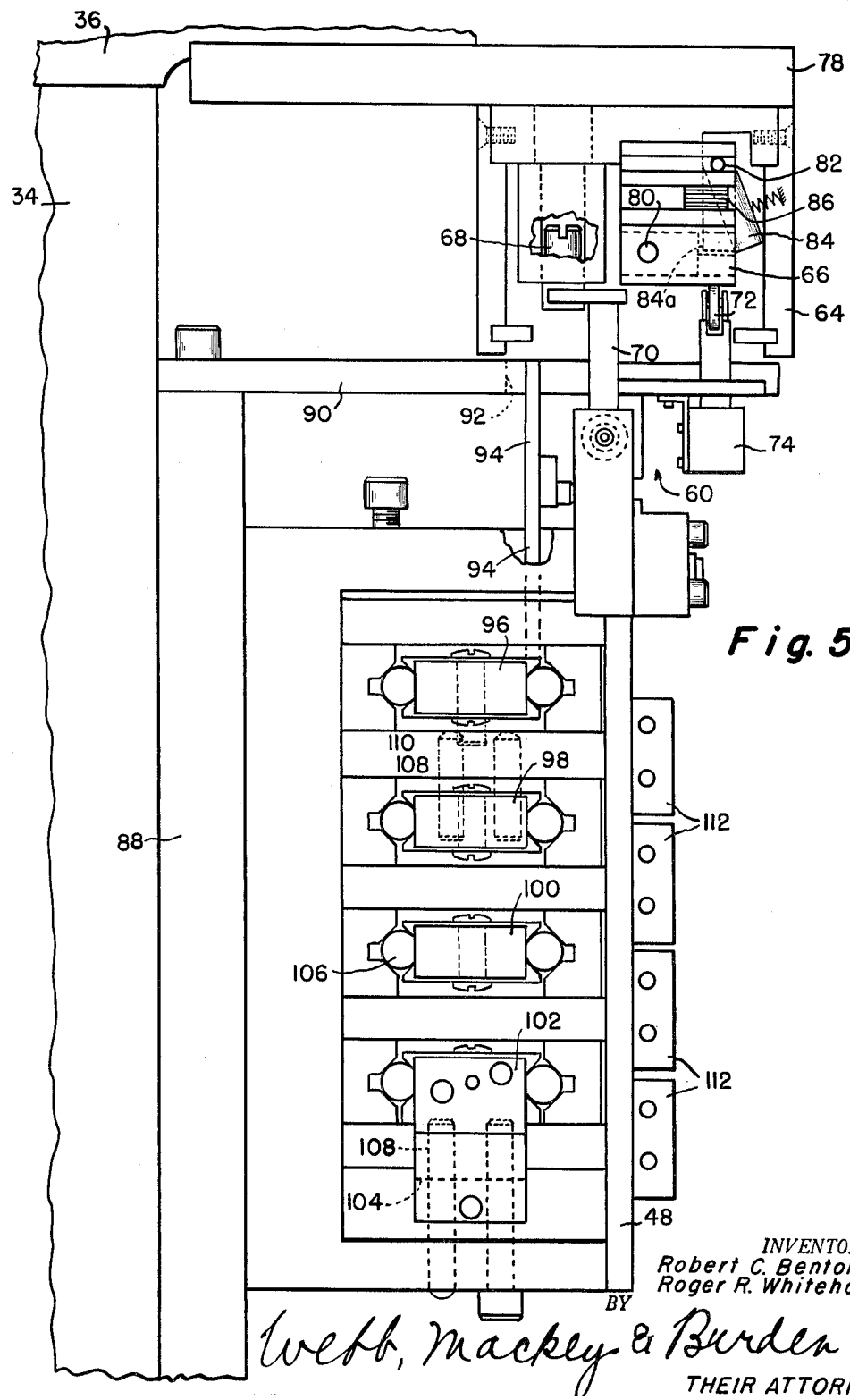
FIGURE 5 is a side elevation corresponding with FIGURE 2 but being to an enlarged scale for showing the control component.

In FIGURE 5, a plate 78 which carries the supporting box 64 is affixed to the relatively movable element which, according to the illustration, consists of the saddle 36.

A first shaft 80 supported within the box 64 carries the individual segments of the cam track 66 and a parallel shaft 82 carries a row of pivoted stops 84, each of which is pin shaped and can pivot in the general direction of the first shaft 80. The stops 84 are blocked by a set of code bars 86 effective to prevent all but one of the stops 84 from swinging into the dotted line position 84a. The associated segment of the cam track 66 is blocked from pivoting upwardly about the first shaft 80, as viewed in FIGURE 5, by whichever stop 84 that occupies the dotted line position 84a.

A plate 88 which supports the positioning control 46 is made fast to the relatively fixed element consisting, in the illustration of FIGURE 5, of the knee 34. A horizontal guard plate 90 is secured by screws at its inner end to the plate 88 and presents a horizontal opening 92 through which the pawl and feeler mechanism 60 projects. A supporting plate 94 for the pawl and feeler mechanism projects at its upper end into the plane of the opening 92 and, at the lower end, it is carried by the relatively most movable one 96 of a set of positioning bars 96, 98, 100, 102 and 104, included in the gage mechanism 48.

Each of the positioning bars is supported in ball bearing runways 106 and they move with reference to the relatively fixed positioning bar 104. Each positioning bar carries a row of double pin projections 108 on its upper face, as viewed in FIGURE 5, and a row of single pin projections 110 on its lower face, as viewed in FIGURE 5. Gage pins (not shown) are introduced so as to intervene crosswise between the projections on the positioning bars and stop them with gage-like precision in their movement as will presently appear. Included for this purpose is a series of code bar positioning cylinders 112 carried by the gage mechanism 48.

In FIGURE 6, one of a pair of air cylinder units 114a is illustrated for operating the code bars 86 (FIGURE 5). According to the illustration, the code bars are rotated slightly out of position and are differentiated by the subscripts $a$ and $b$; each of these code bars 86a and 86b has a serrated upper edge displaying teeth, the gaps of which can be aligned at one point only at any one time so that the corresponding stop 84 (FIGURE 5) can pivot into segment stopping position. The code bar 86a is operated by an air operated plunger rod 116 carried by the unit 114a and a similar plunger rod 118 operates the code bar 86b. Each of the plunger rods 116 and 118 can move the connected code bar between opposite ends of a path of travel delineated by the solid lines and dotted lines respectively in FIGURE 6.

Preferably four code bars are used in which case the permutations and combinations possible, taking into account that each code bar has two positions, enable any one stop of the row of stops 84 to be selectively dropped into segment stopping position. The air cylinder unit 114a further carries a cam connected plunger rod 120 for the particular usage now explained.

Figure 9:
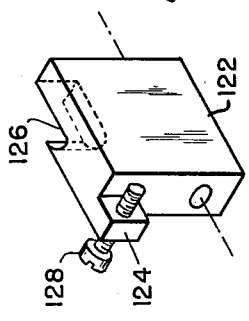
FIGURE 9 is a perspective view of a typical segment of the cam track.

In FIGURES 7, 8 and 9, the cam track 66 is formed of individual segments 122. They each carry a projecting blocker 124 at one outer corner and are rabbeted to provide a relieved portion 126 at the other outer corner for receiving the blocker of the next adjacent segment 122. For proper alignment, each projecting blocker 124 carries a set screw 128 which makes contact with the floor of the adjacent relieved portion 126.

At one end of the line of segments 122, a beveled cam 130, carried by the previously noted cam plunger rod 120 of unit 114a, is effective when advanced to rotate the line of segments 122 simultaneously in one direction (downwardly in FIGURE 7) and this rotation is opposed by means of individual biasing springs 132. Retraction of the cam 130 enables the segments to reversely rotate together only to a point permitted by the actuated stop 84 and from that point to the left of the stop 84, no further movement of the segments is allowed; rightwardly, however, of the selected stop 84, as viewed in FIGURE 7, the segments 122 so located can move an additional distance upwardly about their shaft 80, thus defining a bi-level profile on the cam track 66.

Selection of the appropriate stop 84 is accomplished by the noted code bars 86a and 86b and a cooperating set of code bars 86c, 86d and 86e nested parallel therewith and operated by a companion air cylinder unit 114b. In case a single row composed of two decades of the stop pins 84 in series is employed, the code bar 86e is solely for the purpose of selecting which decade will furnish the selected stop 84.

Figure 10:
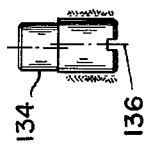
FIGURE 10 is a longitudinal view of the eccentric constituting one of the pawl pins shown in a broken out section of FIGURE 5.

One of the eccentric pins referred to is disclosed in full showing in FIGURE 10 and having an eccentric portion 134 on the pin. Rotation of the pin about its main axis 136 enables an adjustment to be made of the type required to set the pins 68 at the right center distances previously described, and without the expense of extensive precision machining.

Figure 12:
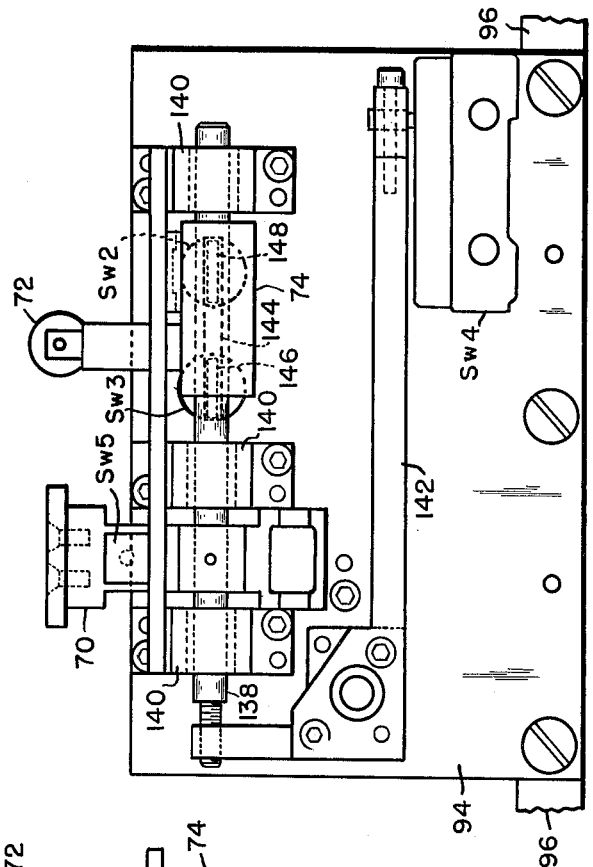
Figure 11:
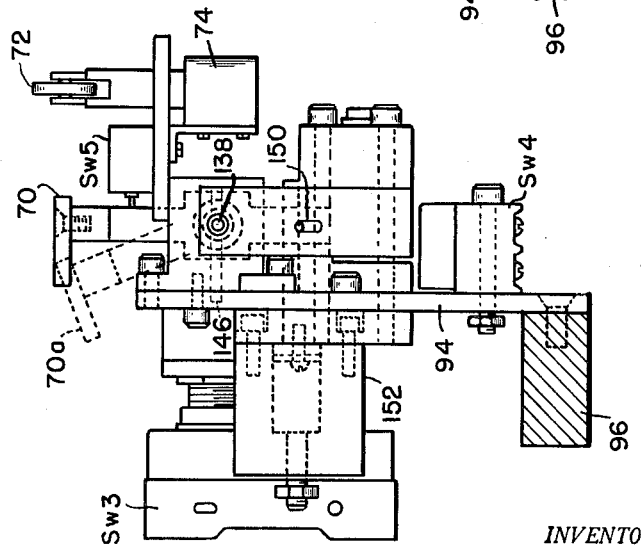
FIGURE 11 is a view corresponding to FIGURE 5 showing the table motion determining mechanism broken away for clarity.

FIGURES 11, 12 and 13 show details of the structure which carries the pawl and feeler mechanism 60 and which is supported on the mounting plate 94 for movement with the positioning bar 96. More specifically, the chief operating element of this structure comprises a slidably and rotatably mounted cam shaft 138 which rides in bearings 140 for supporting the pawl 70 of the pawl and feeler mechanism.

At one end, the shaft 138 controls a switch-operating, bell crank 142. At a relieved mid-portion 144, the shaft presents a pair of spaced-apart cam shoulders controlling a pair of switch-operating, cam followers 146 and 148. The cam followers are spring-biased so as to constantly urge the shaft 138 to a re-centered position with the portion 144 therebetween. The pawl 70 is fast to the shaft 138 and by means of a pin and slot connection 150 to a single acting air cylinder 152, is caused to rock, rocking the shaft therewith. The pawl is retracted by a return spring, not shown The balance of this structure is comprised by the noted finder switch 74 and other switch components which are included in control circuits for the various drives typified by the drives $50_{sad}$ and $50_{tab}$ of FIGURES 2 and 3. The operation and location of these components will be described briefly as an aid in understanding the operating sequence hereinafter appearing.

*Finder switch 74.*—This switch is included in the operating circuit, not shown, of one stepping motor 56 and the corresponding main motor 54 and its brake 58; it is operated by the feeler 72 which in either extreme of its movement inherently operates the control circuits whereby the motors 54 and 56 will cause relative movement in a direction seeking to transversely align the feeler and the break in the cam track. The riding feeler 72 undergoes a transition of position when the break in the cam track rides thereunder and the switch 74 operates to deenergize and brake the motor 54 thus making a first speed reduction establishing slowdown to medium relative speed (e.g., stepping motor operates at 72 r.p.m. shaft speed). Simultaneously, owing to the fact that the switch 74 is included in a control circuit, not shown, for the single acting air cylinder 152, the switch causes the pawl 70 to be forced into the operating position 70a against the urgings of a return spring, not shown.

*Slowdown switch SW2.*—This switch is operated by the cam follower 148 and is included in a control circuit, not shown, for the stepping motor 56. When movement of the relieved portion 144 of the shaft 138 is from right to left as viewed in FIGURE 13, the switch SW2 is operated to make a reduction in the speed of the stepping motor 56 so as to establish a full slowdown condition of movement (e.g., the stepping motor shaft speed reduces to 1/10 r.p.m.).

*Reversing switch SW3.*—This switch is operated by the cam follower 146 and is included in a control circuit, not shown, for the stepping motor 56; when the switch SW3 is actuated by movement of the relieved portion 144 of the shaft from left to right as viewed in FIGURE 13, the relatively moving part will have overdrifted past its assigned position and, at this point, the stepping motor will be reversed and latched for reverse drive operation by means of a latching relay, not shown.

*Stopping switch SW4.*—This switch is operated by the switch operating bell crank 142; when released by the bell crank 142 owing to relative movement of the shaft 138 in the right-to-left direction as viewed in FIGURE 12, the switch SW4 open circuits the control circuit, not shown, for the stepping motor 56 so as to stop all relative movement.

*Interlocking switch SW5.*—This switch is included in various anticycling and interlock circuits, not shown, which contribute materially although in conventional manner to make the operation foolproof. In the interests of brevity, the foregoing circuits will not be specifically described, but it will be apparent that a new cycle will not be permitted to start by the switch SW5 until the pawl 70 is fully retracted by means of the return spring, not shown. Consequently, the pawl is never caught between pins or still in a pin engaging position when the positioning motors are reenergized.

The stopping sequence accomplished by the table motion-determining structure is shown according to a velocity displacement diagram in FIGURE 14. Consistent with the structure as viewed in FIGURE 12, the final motion of the shaft 138 and, hence, the final relative motion in the velocity displacement diagram are in the direction from right to left at which the switch operating bell crank 142 finally releases the switch SW4 to stop all motion. On the other hand, velocity and displacement originally in the leftward direction as viewed in FIGURE 14 are shown to have negative charcteristics.

More particularly, the negative velocity curve 154 is attended by the following sequence of steps.

(1) The feeler 72 rides over the break in the cam track thus concluding the finding function. The finder switch 74 therefore at the point 1 (indicated on curve 154)

(a) Transfers control of the drive mechanism to switches SW3 and SW4,
(b) Deenergizes the main drive motor 54 and energizes the brake 58, and
(c) Pivots the pawl 70 into its operating position by means of the air cylinder 152.

(2) As the brake is being applied thus to reduce the velocity of the still moving main motor mechanism, the outmoving pawl 70 straddles a passing pin 68 but with sufficient prematurity that the V-notch of the pawl attempts to make it move in an opposite direction from the pin motion temporarily. Consequently, the bell-crank-operated switch SW4 is released and simultaneously the cam shaft-operated switch SW3 is released so as to disable the stopping circuit, not shown, containing SW4; as a result, the switch SW4 is disabled temporarily to prevent it from stopping the table. The stepping motor therefore continues jogging the table to move it past the stopping point, doing so a medium speed due to on-off current pulsations through the stepping motor.

(3) The pawl 70 is cammed by the sliding of one side of its V-notch across the pin, and then the pawl firmly seats itself on the passing pin so that at point 3 on the curve 154 the pawl undertakes the same motion of the table from left to right.

(4) The table moves the pawl 70 so as to reclose the temporarily released stopping switch SW4 and so as to reclose the temporarily released reversing switch SW3, thus reversing the stepping motor and reinstating the stopping switch SW4 in charge of the control circuit for the stepping motor. The reversal is completed at point 4 on the curve 154 whereafter movement is from right to left (as viewed in FIGURE 14) at medium speed produced by the stepping motor.

(5) (6) Continued movement of the shaft 138 operates, at point 5 on the curve 154, the slowdown switch SW2 which causes stepping motor to be set in slowdown. With discrete motions, therefore, each consisting of a part rotation followed by an interval of no motion, the table is jogged toward the stopping point indicated at 6 at which the bell-crank-operated switch SW4 is released so as to stop the table.

The opposite motion is from right to left as viewed according to curve 156 of FIGURE 14, and the sequence is as follows.

(7) The finder switch at point 7 deenergizes the main drive motor 54 and sets the brake, and also it operates the pawl and a take-over circuit which transfers the drive to the control of the switches SW3 and SW2.

(8) At point 8 on the curve 156, the V-notched pawl and the cam shaft 138 temporarily take counter motion in a direction of movement opposite from that of the table so that the switches are set for a sequence, and the stopping switch SW4 is actuated to be available for stopping the table. The pawl, after a false start from being cammed the contrary way, quickly reverses its motion so as to take the same motion as the table.

(9) Upon movement of the pawl to point 4 along the curve 156, it is seen that at this point the two curves 154 and 156 merge and the operation proceeds to point (5) and to the stopping point (6) in the previous manner.

The curves 154 and 156 of FIGURE 14 are not drawn to scale. Moreover, they are smooth shaped as shown whereas actually the velocity is a composite with the main drive motor furnishing smooth torque, and with superposition thereon from 158 and 160, of the jogging torque of the stepping motor which starts running each time the main drive motor 54 starts running. The characteristic of the instantaneously applied and released jogging torque is that it is never attended with residual stress left in the drive, such as might lead to elastic disturbances in the system later causing overtravel.

The electrical circuits which operate the motors in response to actuation of the foregoing switches are well known in the art and therefore not illustrated.

Figure 17:
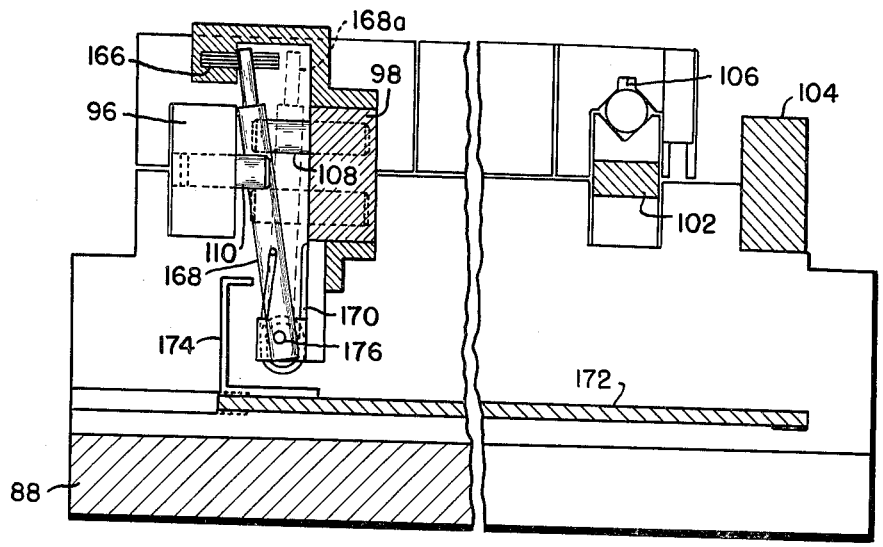
FIGURE 17 is a section taken along the lines XVII—XVII of FIGURE 15 to show one of the gage pins.

In FIGURES 15, 16 and 17, the air cylinders 112 are shown mounted to the gage mechanism at points between each set of the code bars 96, 98, 100, 102 and 104. These cylinders control code bar positioning shafts 162 which are spring returned to a normal inward position as viewed in FIGURE 15 but which are separately air operated to move outwardly. Each shaft 162 carries a fixed collar 164 connected by means of an inwardly protruding pin (not shown) to one code bar in each set of four code bars 166 (FIGURE 17). Each of these sets of the code bars 166 controls, by means of gapped teeth in a manner presently appearing, a decade 168 of gage pins already referred to; in this way, individual gage pins of each decade 168 can be selectively moved from the dotted line position 168a to the solid line position shown in FIGURE 17. Thus, one pin of each decade is selectively trapped between the row of double lateral projections 108 and the row of single lateral projections 110 carried between the respective positioning bars. Each of the single projections 110 is an eccentric pin of the type shown in FIGURE 10 so as to provide highly accurate, center to center adjustment.

Torsion springs 170 individual to the pins of each decade 168 urge them toward the solid line position of FIGURE 17 whereas a resetting plate 172 is slidably mounted with relation to the attachment plate 88 for resetting all decades of pins at once. For this purpose, a series of angle members 174 (FIGURE 17) protrudes upwardly in engagement with the bottom portion of the pin decades, each decade of which has a fixed pivot shaft 176.

A single acting air cylinder 178 is connected by means of a link 180 pivoted intermediate its ends to reciprocate the plate 172 under power. A double acting air cylinder 182 has a universal joint connection 184 to the most relatively movable one 96 of the positioning bars. Due to Z-shaped members 186 each carrying a set screw and affixed at a corresponding end of the positioning bars, the arrangement is such that retractive motion of the air cylinder 182 retracts the positioning bar 96 and all other bars in unison.

Advancing motion of the double acting air cylinder 182 causes advance of the bar 96 with respect to the relatively fixed bar 104 whereby each intervening positioning bar 98, 100 and 102 owing to the interposed gage pins and projections at each side thereof, is advanced. The point of stopping of each bar occurs where the associated decade pin is restrained by being trapped against the projections carried by the adjacent, less relatively movable positioning bar. Thus, the positioning bar 96 by which the pawl and feeler mechanism attached to the plate 94 is caused to move, undergoes the aggregate of all relative movements.

Figure 18:
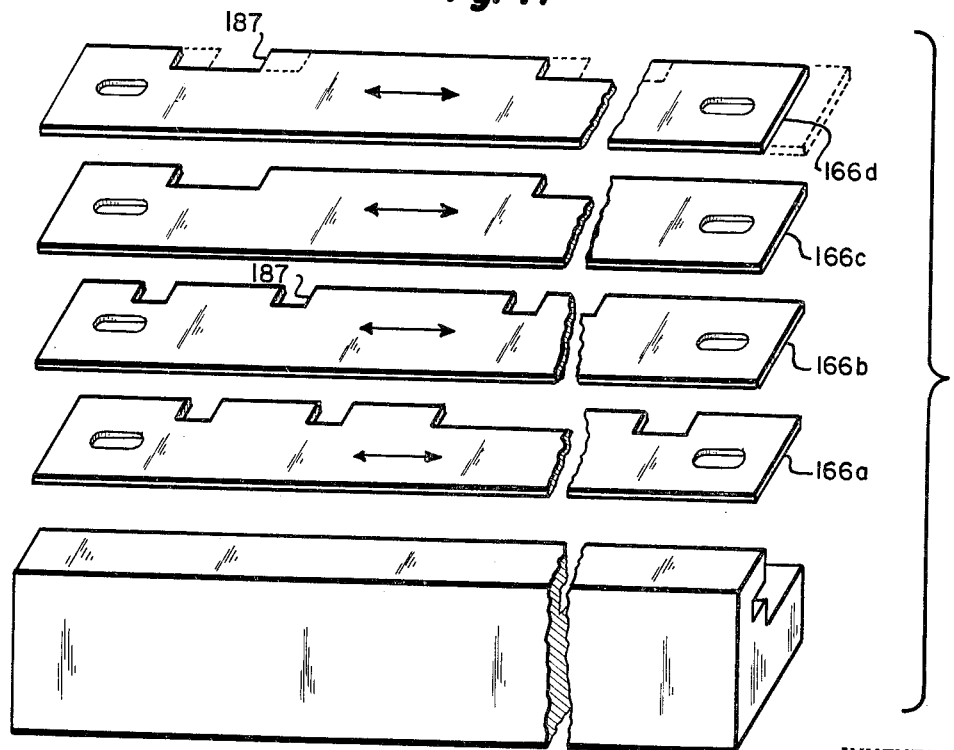
FIGURE 18 is an exploded view of the code bars appearing in FIGURE 17 for positioning the gage pins.

The code bars 166 of preceding FIGURE 17 are shown identified in FIGURE 18 with appropriate subscripts so as to read 166a, 166b, 166d and 166c. They each move between a set of two extreme positions, which, in the example of bar 166d, are shown by dotted lines and solid lines. The irregular teeth 187 thereon are so arranged that only one of the gage pins in a decade 168 can move into a position trapped between projections on the confronting positioning bars. The code bars are operated by the aforementioned air cylinders 112 which are responsive to a binary code input signal.

In FIGURES 19, 20, 21, 22 and 23, the positioning bars 96, 98, 100, 102 and 104 are shown rotated out of their operating position (FIGURE 17) for clarity; it will be understood that the single pin projections 110 on the positioning bar 96 will confront the double row projections 108 on the adjacent positioning bar 98; likewise, the row of single pin projections 110 on the positioning bar 98 will confront the double row of projections 108 on the next adjacent positioning bar 100, etc.

Appropriate adjustment of the eccentric portion 134 (FIGURE 10) of the single pin projections 110 on the bar 96 enables the following relationship to precisely occur: when the shoulder of the bar 96 advances according to the arrow to a point squarely opposite a zero reference point 188 on the bar 98, a trapped pin $p_{2a}$ of the decade 168 of gage pins squarely intervenes between the adjacent leading pin projection 110 and the leading double projections 108 on the positioning bar 98. If, instead, the next gage pin $p_{2b}$ of decade 168 were to be trapped between a corresponding single projection 110 and the confronting double projections 108, the positioning bar 96 would require movement of 0.1000" past the zero reference point 188 on the bar 98.

In a similar manner for gage pins $p_{2c}$, $p_{2d}$, etc., the relative position of the bar 96 can be accurately gaged to relatively extend by a selected distance of 0.2000", 0.3000" etc. past the zero reference mark 188 on the less relatively movable positioning bar 98.

The eccentrically adjusted single pin projections 110 on the bar 98 and the double projections 108 on the adjacent bar 100 are so related that when they trap the respective gage pins $p_{3a}$ or $p_{3b}$, etc. of the intervening decade 168 therebetween, the zero reference mark 188 takes a position either squarely aligned with a zero reference mark 190 on the bar 100 or else 0.0100" therepast or 0.0200" therepast or 0.0300" therepast, etc. in the direction of the arrow.

The gage pins $p_{4a}$, $p_{4b}$, etc. within the next decade 168 are trapped between the projections to establish the differences of relative position magnitude of 0.0000", 0.0010", 0.0020", etc.; the pins $p_{5a}$, etc. in the final decade 168 establish the relative readings of 0.0000", 0.0001", 0.0002", etc. The result is that by proper selection of gage pins, the positioning bars of the gage mechanism 48 become an automatic gage for the position of the pawl and feeler mechanism at any point between 0.0000" and 0.9999", inclusive, with the readings having good repeatability accurate to the nearest ±0.0001".

At the beginning of each gaging cycle, the double acting air cylinder 182 unloads the positioning bars by full retraction of the positioning bar 96 which through their Z-shaped interconnection members 186 retracts the others therewith. The single acting cylinder 178 is actuated to pivot the lever 180 clockwise as viewed in FIGURE 15 causing the spring biased decades 168 of gage pins to be freed by the angle members 174 from the teeth of the code bars 166 (FIGURE 17). The code bars 166 are then repositioned whereupon an opposite sequence transpires, namely the cylinder 178 is released enabling the selected pins of the decades 168 to move between the right code bar teeth, and the cylinder 182 reverses and reloads the positioning bars so that they take their next advanced setting as limited by the gage pin decades 168.

The foregoing gaging cycle is repeated following each machining operation.

In over-all operation of a two axis or three axis positioning table according to the preceding figures, decimal machining data is introduced either directly by means of the dials referred to or else after having been encoded on tape in a binary code form. One gage mechanism 48 (FIGURE 4) of the small increment positioner 46 of each positioning control operates to set the fractional decimal portion of the reading required with relation to the zero reference point 76 (FIGURE 4), in readiness for the pawl 70 ultimately tripping the stopping switch and stopping the table when it reaches that fractional decimal reading. Thereafter, in response to binary code input to a tape reader, not shown, the motor units 114a and 114b cause a selected one of the stops 84 and the cam 130 to be activated in sequence. As a result, the cam track 66 will be manipulated producing a break in the joint at a point corresponding to the whole number of each decimal reading encoded, i.e., one inch or some multiple thereof. Both motors 54 and 56 are then put in operation (FIGURE 3) setting the table drive in motion. The feeler 72 of FIGURE 4, when on the high side of the break in the cam track profile, will operate the finder switch 74 causing automatic relative movement one way in the direction of the low side whereby the switch and the break in the joint will straightforwardly be brought together; when on the low side of the break on the cam track profile, the feeler 72 will operate the finder switch so as to cause automatic relative movement in the opposite way in the direction of the high side whereby the break in the joint will seek the switch.

Subsequent activation of the pawl 70 causes the table to overrun its ultimate position, or not, dependent in accordance with FIGURE 14 upon the direction of approach of the fast moving pins 68 relative to the pawl 70. In either case, final motion of the pin 68 engaged by the pawl 70 results in tripping open the stopping switch SW4 and stopping the table. When table motion on all axes has reached a fully satisfied position, the table drive motors will be still and the table is locked so that a workpiece carried on the work table has a firm position for machining at the established point.

Variations within the spirit and scope of the invention described are equally comprehended by the foregoing description.

We claim:

1. A positionable table having: control apparatus for positioning same relative to a reference head carrying table-stopping mechanism, a feeler included in and supported by the table-stopping mechanism on the reference head, drive means included in said control apparatus connected to cause bidirectional movement of the table relative to the reference head carrying said table-stopping mechanism, a retracted pawl on the reference head shiftably mounted to said mechanism for effecting engagement with the table at a selected one of a plurality of engageable points thereon, an actuator carried by the table and adapted to contact the feeler on the table-stopping mechanism when a predetermined point on the table is moving past said mechanism, means responsive to said contact for operating said pawl in timed relation to passing motion of the table so as to interengage with said table at said one point of engagement aforesaid, and means in said control apparatus responsive to the interengagement of the pawl with said moving table for interrupting the drive means to stop said table.

2. Table control apparatus for positioning a table along a longitudinal axis, comprising a table-connected element moveable with the table, a reference head element, large increment and small increment positioning means to move said elements into respective positions side by side on said axis with the reference head element proceeding first to a preset small increment setting, and a pawl and a feeler supported in common on said reference head element and cooperating to establish relative movement of contact transversely between said moving table element and said preset reference head element, said contact being incurred by said pawl at a pre-determined one of points on said table-connected element which are longitudinally spaced apart at equal intervals, said table-connected element carrying an individual actuator corresponding to each of said uniformly spaced apart points thereon, and selectively adapted for one actuator to contact said feeler on said reference head element, and means responsive to said contact and connected to the pawl on said reference head to cause it to engage the point on the table-connected element to which said actuator corresponds.

3. Table control apparatus for positioning a table along a longitudinal axis comprising a table-connected element moveable with the table, a reference head element, large increment and small increment positioning means to move said elements into respective positions side by side on said axis with the reference head element proceeding first to a preset small increment setting, a pawl and a feeler supported in common on said reference head element and cooperating to establish relative movement of contact transversely between said moving table element and said preset reference head element, said contact being incurred by said pawl at a pre-determined one of points on said table-connected element which are longitudinally spaced apart at equal intervals, said table-connected element carrying a segmentally jointed cam track adapted to break into two levels at the joint at a selective position corresponding to any engagement point on the table-connected element, said feeler adapted to ride upon the surface of the passing cam track thus to occupy the high or low side of the break in the cam track, said large increment positioning means comprising a reversible table-driving motor unit having a connection for driving said table, bidirectional motor control circuit means for said unit, and means responsive to the momentary riding position of the feeler and connected in said bidirectional motor control circuit means for driving said table always in a direction moving the break in the cam track toward a satisfied position having the feeler riding directly at said break.

4. In a positionable table structure comprising a table-connected element and a reference head element operatively related therewith in a relatively stationary position with respect thereto, means supporting said elements in the operative relationship aforesaid comprising reversible positioning means for relatively positioning one element with respect to the other, a segmentally jointed cam track connected for movement with one of said elements, means effective to break said cam track at one joint whereby the cam track is continuous on both opposite sides thereof in a manner to establish a sharply defined bilevel cam profile along said one element, a feeler mounted on the other element to ride on the profile of the cam track, and a finder switch operated by said feeler and connected to the reversible relative positioning means so that the feeler when on the high side of the break in the cam track profile will operate the finder switch causing automatic relative movement one way in a direction whereby the switch will seek the break in the joint, and so that the feeler when on the low side of the break in the cam track profile will operate the finder switch causing automatic relative movement in the opposite direction whereby the switch will seek the break in the joint.

5. In a positionable table structure comprising a table-connected element, a reference head element operatively related therewith in a relatively stationary position with respect thereto, and means supporting said elements in the operative relationship aforesaid comprising reversible positioning means for relatively positioning one element with respect to the other, the combination comprising a segmentally jointed cam track connected for movement with one of said elements, means effective to break said cam track at one joint to establish a sharply defined bilevel cam profile along said one element, a feeler mounted on the other element to ride on the profile of the cam track, a finder switch operated by said feeler and connected to the reversible relative positioning means so that the feeler when on the high side of the break in the cam track profile will operate the finder switch causing automatic relative movement one way whereby the switch will move toward the break in the joint, and so that the feeler when on the low side of the break in the cam track profile will operate the finder switch causing automatic relative movement the opposite way toward the high side whereby the switch will move in the direction of the break in the joint, an actuator on one of said elements and positioned and effective to contact the other element when said feeler reaches the break in the joint of the cam track profile, and means responsive to said contact and connected to said relative positioning means for bringing about a change in the character of the motion of relative movement.

6. In a positionable table structure comprising a table-connected element, a reference head element cooperatively related therewith in a relatively stationary position with respect thereto, and means supporting said elements in the cooperative relationship described comprising reversible positioning means for relatively positioning one element with respect to the other, the combination comprising a segmentally jointed cam track connected for movement with one of said elements, means effective to break said cam track at one joint whereby the cam track is continuous on both opposite sides thereof in a manner to establish a sharply defined bilevel cam profile along said one element, a feeler mounted on the other element to ride on the profile of the cam track, a finder switch operated by said feeler and connected to the reversible relative positioning means so that the feeler when on the high side of the break in the cam track profile will operate the finder switch causing automatic relative movement one way in a direction whereby the switch will seek the break in the joint, and so that the feeler when on the low side of the break in the cam track profile will operate the finder switch causing automatic relative movement in the opposite direction whereby the switch will seek the break in the joint, an actuator on one of said elements and positioned and effective to contact the other element when said feeler reaches the break in the joint of the cam track profile, and slowdown means responsive to said contact and connected to said reversible relative positioning means for operating same in a slowdown condition.

7. In a positionable table structure comprising a table-connected element, an element establishing an operative relation therewith in a relatively stationary position with respect thereto, and means supporting said elements in the operative relationship described comprising reversible positioning means for relatively positioning one of said elements with respect to the other; the combination comprising a segmentally jointed cam track connected for movement with one of said elements, means effective to break said cam track at one joint establishing a sharply defined bilevel cam profile along said one element, a feeler mounted on the other element to ride on the profile of the cam track, a finder switch operated by said feeler and connected to the reversible relative positioning means so that the feeler when on the high side of the break in the cam track profile will operate the finder switch causing automatic relative movement one way in the direction of the low side whereby the switch will move straightforwardly toward the break in the joint, and so that the feeler when on the low side of the break in the cam track profile will operate the finder switch causing automatic relative movement the opposite way in the direction of the high side whereby the switch will move straightforwardly toward the break in the joint, an actuator on one of said elements and positioned and effective to contact the other element when said feeler reaches the break in the joint of the cam track profile, and reverse and slowdown means responsive to said contact and sensitive to the direction thereof as established and connected to said reversible relative positioning means for reversing the motion of relative movement if said contact is established in one direction and for slowing the motion of relative movement if contact is made in the opposite direction.

8. Positionable table structure comprising the combination of relatively movable elements, a limit switch operating, V-notched pawl engageable by and capable of limited movement with one of said elements, limit switches supported by the other element whereby relative movement between elements moves the pawl to set and then operate the switches and wherein dependent on the position of said one element, operation of one switch reverses the direction of relative motion from an unwanted direction to a wanted direction, and operation of another switch slows down the motion in said wanted direction, and actuating means for causing engagement between the V-notched pawl and said one element to occur, first, at a point where the notch in the pawl makes temporary contact at one side of the notch to move the pawl in counter motion to the one element to set the switches for operation and, second, at a firmly seated point where the pawl undertakes the same motion of the one element for operating the switches as aforesaid.

9. A positionable table structure comprising the combination of relatively movable elements of which one is adapted to carry a V-notched pawl which is initially interengageable with means on the other element, a power drive for causing relative movement between said elements and having a control circuit for reversibly operating said drive, a pivot shaft carrying said pawl on said one element and capable of limited bidirectional endwise movement with respect to said one element, and spaced-apart switches operated by motions of said shaft in differing directions and connected in said control circuit with one arranged for reversing said drive in response to motion of the shaft and pawl in one direction and the other connected for placing said drive in slowdown during motion of the shaft and pawl in a different direction.

10. In a positionable table structure, relatively movable elements of which one is adapted to carry a V-notched pawl which is initially engageable and finally interengageable with means on the other element, a power drive for causing relative movement between said elements and having a control circuit for reversibily operating said drive, a pivot shaft carrying said pawl on said one element and capable of limited endwise movement with respect to said one element, spaced-apart switches operated respectively by motions of said shaft in different directions and connected in said control circuit with one arranged for placing said drive in slowdown in response to motion in one direction and another connected for interrupting said drive to stop the table during motion in that direction, and actuating means for causing engagement between the V-notched pawl and said one element to occur, first, at a point where the notch in the pawl makes temporary contact at one side of the notch to move the pawl in counter motion to the one element to set the switches for operation and, second, at a firmly seated point where the pawl undertakes the same motion of the one element for operating the switches as aforesaid.

11. Positionable table structure comprising a table-connected element and a relatively stationary element, a V-notched pawl, one of said elements adapted to carry said pawl which is initially engageable and finally interengageable with means on the other element, a power drive for causing relative movement between said elements and having a control circuit for reversely operating said drive, a pivot shaft carrying said pawl on said one element and capable of limited bidirectional endwise movement with respect to said one element, plural limit switches supported by said one element whereby the bidirectional movement between the table-connected element and the stationary element engages the shaft against different ones of the switches and wherein dependent on the position of said table-connected element, operation of one switch reverses the drive from unwanted motion to motion in a wanted direction, operation of another switch reduces the speed of travel of the table-connected element in the wanted direction of motion, and operation of a further switch stops the table-connected element, and actuating means for causing engagement between the V-notched pawl and said one element to occur, first, at a point where the notch in the pawl makes temporary contact at one side of the notch to move the pawl in counter motion to the one element to set the switches for operation and, second, at a firmly seated point where the pawl undertakes the same motion of the one element for operating the switches as aforesaid.

12. Positionable table structure comprising the combination of a table-connected element and an element which is a relatively stationary element thereto, of which elements one is adapted to carry a V-notched pawl which is interengageable with means on the other element, a power drive for causing relative movement between said elements and having a control circuit for reversibly operating said drive, a pivot shaft carrying said pawl on said one element and capable of limited bidirectional endwise movement with respect to said one element, and spaced-apart switches operated by different respective motions of said shaft, and connected in said control circuit with one arranged for reversing said drive in response to motion in an unwanted direction and the other connected for stopping said table-connected element during motion in the wanted direction.

13. In a positionable table structure, relatively movable elements of which one is adapted to carry a V-notched pawl which is initially interengageable with means on the other element, a power drive for causing relative movement between said elements and having a control circuit for reversibly operating said drive, a pivot shaft carrying said pawl on said one element and capable of limited bidirectional endwise movement with respect to said one element, spaced-apart switches operated by motions of shaft in different directions and connected in said control circuit with one arranged for reversing said drive in response to motion in one direction and another connected for placing said drive in slowdown during motion in another direction, and means for rotating said shaft to pivot the pawl into said initial engagement for causing said shaft to be moved.

14. Positionable table structure comprising the combination of a table-connected element and an element which is relatively stationary thereto, of which elements one is adapted to carry a V-notched pawl which is initially interengageable with means on the other element, a power drive for causing relative movement between said elements and having a control circuit for reversibly operating said drive, a pivot shaft carrying said pawl on said one element and capable of limited bidirectional endwise movement with respect to said one element, spaced-apart switches operated by differing respective motions of said shaft, and connected in said control circuit with one arranged for reversing said drive in response to motion in an unwanted direction and the other connected for stopping said table-connected element during motion in the wanted direction, and means for rotating said shaft to pivot the pawl into said interengagement for causing said shaft to be moved.

15. Positioning apparatus for establishing, accurately in terms of both the integer portion and the decimal portion of a total coordinate dimension desired, the position of a member, e.g., the table of a machine tool, said apparatus comprising: a drive for driving the member in a direction of movement; a cam track and reference elements carried by said member; said cam track having adjustable discontinuity; the reference elements being equidistantly spaced apart in a series in the direction of movement by equal whole increment distances corresponding to consecutive integers; stop means operating to discontinue the drive and halt the member during its movement and the conjoint movement therewith of the cam track and reference elements carried by said member, and arranged whereby the stop means is actuated for operation by an element which is a selected one of the reference elements in the series and selected in accordance with the location of a discontinuity in the cam track; said stop means including an actuated part mounted thereon for movement between an inactive position spaced from said series of elements, and an active position in their path for actuation by engagement with the selected reference element whereby the actuated part moves with said element and operates the stop means; and means for pre-setting said stop means in an advanced position in the direction of movement of the member corresponding to the decimal portion of said coordinate dimension.

References Cited by the Examiner
UNITED STATES PATENTS

| | | | |
|---|---|---|---|
| 2,307,214 | 1/43 | Gollmer | 74—568 |
| 2,313,477 | 3/43 | Neff | 74—568 |
| 2,653,519 | 9/53 | Armitage | 318—266 X |
| 2,674,706 | 4/54 | Knosp et al. | 318—8 |
| 2,686,894 | 8/54 | Mathieu | 318—467 X |
| 2,796,565 | 6/57 | Walcott | 318—8 |
| 2,806,191 | 9/57 | Montross-Oster | 318—8 |
| 2,876,650 | 3/59 | Sangster | 318—162 X |
| 2,879,599 | 3/59 | Masinda | 33—125 |
| 2,899,621 | 8/59 | Bauer | 318—467 |
| 2,908,978 | 10/59 | Knosp | 33—125 |
| 2,960,688 | 11/60 | Prochaska et al. | 318—467 X |
| 3,002,404 | 10/61 | Estabrook | 318—162 X |
| 3,011,113 | 11/61 | Jerue et al. | 318—467 |
| 3,013,195 | 12/61 | Langham | 318—162 |
| 3,024,396 | 3/62 | Peckjian | 318—162 |
| 3,024,610 | 3/62 | Ulman | 318—162 X |
| 3,027,703 | 4/62 | Rayle | 318—162 X |
| 3,071,028 | 1/63 | Wagner | 318—467 X |
| 3,080,512 | 3/63 | Cubbidge et al. | 318—162 X |
| 3,100,406 | 8/63 | Knosp et al. | 318—162 X |
| 3,109,329 | 11/63 | Knosp et al. | 318—162 X |

ORIS L. RADER, *Primary Examiner.*
JOHN F. COUCH, *Examiner.*